United States Patent [19]

Tzur et al.

[11] Patent Number: 5,293,287
[45] Date of Patent: Mar. 8, 1994

[54] APPARATUS AND METHODS FOR BACKSIDE STABILIZATION OF FLEXIBLE OPTICAL MEDIA IN INFORMATION STORAGE SYSTEM

[75] Inventors: Israel Tzur; David R. Dodds, both of Boulder, Colo.

[73] Assignee: Iomega Corporation, Roy, Utah

[21] Appl. No.: 970,992

[22] Filed: Nov. 2, 1992

Related U.S. Application Data

[63] Continuation of Ser. No. 525,894, May 18, 1990, abandoned.

[51] Int. Cl.$^5$ .............. G11B 23/033; G11B 25/04
[52] U.S. Cl. .............. 360/98.03; 360/130.1; 360/133; 369/261; 369/292
[58] Field of Search .............. 369/291, 292, 270, 261; 360/102, 103, 133, 99.01, 99.04, 99.08, 128, 129, 130.1, 98.03

[56] References Cited

U.S. PATENT DOCUMENTS

| | | | |
|---|---|---|---|
| 3,509,553 | 4/1970 | Krignen | 340/174.1 |
| 3,838,461 | 9/1974 | Barbeau et al. | 360/98.03 |
| 3,990,109 | 11/1976 | Sefert | 360/98.03 |
| 4,003,091 | 1/1977 | Wright | 360/99.01 X |
| 4,074,330 | 2/1978 | Norton et al. | 360/99.01 X |
| 4,414,592 | 11/1983 | Losee et al. | 360/102 |
| 4,600,955 | 7/1986 | Regruit | 360/102 X |
| 4,740,851 | 4/1988 | Jones et al. | 360/99.08 |
| 4,743,989 | 5/1988 | Bauck et al. | 360/133 |
| 4,769,733 | 9/1988 | Freeman et al. | 360/133 |
| 4,791,515 | 12/1988 | Tanaka et al. | 360/133 |
| 4,888,761 | 12/1989 | Ohta | 369/291 |

OTHER PUBLICATIONS

McMorty, "Double Bernoulli Disk Configuration", Feb. 1977, IBM TDB, vol. 19 No. 9, pp. 3573-3574.

Cope et al, "Bernoulli Disk Decoupler and Stabilizer", Aug. 1977, IBM TDM, vol. 20 No. 3, pp. 916–917.
Seifert, H. G., IBM Technical Disclosure Bulletin, "Foil Splitter For Flexible Disk Pack", vol. 20, No. 6, Nov. 1977, p. 2266.
Bowen, A., IBM Technical Disclosure Bulletin, "Flexible Magnetic Disk Stack", vol. 21, No. 7, Dec. 1978, pp. 2957-2958.

*Primary Examiner*—Eugene R. LaRoche
*Assistant Examiner*—Michael C. Kessell
*Attorney, Agent, or Firm*—Woodcock, Washburn, Kurtz, Mackiewicz & Norris

[57] ABSTRACT

Methods and apparatus for providing Bernoulli stabilization to flexible media in an information storage system, are shown to include a stabilizer having a body on which a first surface is formed of a contour sufficient to provide Bernoulli stabilization to media passing thereover. The stabilizer is positioned so that the first surface is proximate backside of the media. In one embodiment, the first surface has a number of grooves which channel air passing between the first surface and the backside. In those situations where the flexible media includes two flexible disks, each having an active side and a backside and where the disks are oriented so that the backsides face one another, the body further includes a second surface of a contour sufficient to provide Bernoulli stabilization to media passing thereover. In such situations the stabilizer is positioned between the disks. In a still further embodiment the disks are rotatably mounted in a cartridge which includes a housing having an opening along one side thereof to allow access to the disks and a separator, attached to the housing and positioned between the disks, for providing separation of the disks. In such a situation when the cartridge is positioned in relation to the information system the space between the disks is accessible.

18 Claims, 4 Drawing Sheets

APPARATUS AND METHODS FOR BACKSIDE STABILIZATION OF FLEXIBLE OPTICAL MEDIA IN INFORMATION STORAGE SYSTEM

This is a continuation of application Ser. No. 525,894, filed May 18, 1990 abandoned.

FIELD OF THE INVENTION

The present invention relates to the field of information storage systems which utilize flexible media and, more particularly, to methods and apparatus for stabilizing such media during read/write operations.

BACKGROUND OF THE INVENTION

In present information storage systems utilizing flexible disk-type media, the media is typically enclosed within a cartridge or a sleeve for insertion into a disk drive. A drive spindle engages the media at a hub, and the disk is rotated about a central axis. Information is generally recorded to or read from the outside surfaces of the media by either a magnetic head in a magnetic disk drive, an optical head in an optical disk drive or a combination magnetic and optical head in a magneto-optical disk drive. Typically the outside surface of the media is covered with an active layer in which recording of information occurs.

In a magnetic disk drive the spacing between the magnetic head and the media active layer must be very small and accurately controlled in order to allow the magnetic coil and gap on the magnetic head to either change the polarity of the magnetic media during a write operation, or to sense the polarity of the media during a read operation, over a small precise location on the media. In an optical disk drive the spacing between the objective lens on the optical head and the media active layer must be accurately controlled in order to allow a laser beam to be focused onto a small precise location on the media disk.

In a magnetic disk drive for flexible magnetic media the magnetic heads are either suspended on a flexure mechanism which allows them to accurately follow the surface contour of the media or the magnetic heads are designed to make the media conform to the contour of the head, as in a Bernoulli stabilized disk drive disclosed in U.S. Pat. No. 4,414,592—Losee et al.

In an optical disk drive for flexible optical media the optical head is either provided with a focus motor which allows the focused beam to accurately follow the surface contour of the media or a feature of the cartridge, optical head or both is designed to make the media conform to the focus requirements of the optical head.

One approach for forcing optical media to conform has been the provision of gross and fine Bernoulli stabilization. Such a system is disclosed in U.S. patent application Ser. No. 167,652, filed Mar. 14, 1988 and entitled OPTICAL READ/WRITE STORAGE SYSTEM FOR FLEXIBLE MEDIA HAVING BERNOULLI STABILIZATION AT THE OPTICAL HEAD, owned by the Assignee of the present invention. In that system, a Bernoulli surface provides gross stabilization to the flexible optical media while a coupler element provides fine Bernoulli stabilization in the region immediately proximate the optical head assembly objective lens.

In a magnetic flexible media disk drive the magnetic heads are either retracted and lifted away from the outer surface of the media during insertion of the media or the edges of the magnetic heads, which could possibly engage the media during insertion, are carefully contoured to allow the media to slip over the edge of the magnetic head with minimum force. In an optical disk drive which uses a focus motor the optical heads are located far enough away from the media area during media insertion so that no contact is made with the media. In an optical disk drive which uses Bernoulli stabilization on the optical head, the heads are contoured to allow the media to slide over the edge of the optical head during insertion of the media cartridge.

In the aforementioned magnetic and optical flexible media disk drives the heads and/or stabilizing mechanisms are only used on the outer (active layer) surface of the media. In the case of the magnetic flexible media disk drives or in the case of optical flexible media disk drives which use Bernoulli stabilization on the optical head there can exist continuous or intermittent contact of the head with the active surface of the media. This can cause wear or damage to the recording layer. This problem is much more severe in the case of the optical disk drive which uses Bernoulli stabilization on the active surface because the recording density of the optical media is much higher than that of the magnetic media. A scratch on a flexible disk which is small enough to be ignored by the magnetic head in a magnetic disk drive could easily be large enough to destroy many bytes or tracks of information in an optical disk drive. Additionally, in the case of both the magnetic flexible media disk drives and the optical flexible media disk drive the present insertion techniques limit the number of heads which can be used in a flexible media drive, since the heads are constrained to the outer surface of the media only.

In certain situations, the closeness of the media to the fine stabilization surface has exhibited excessive wear. As will be appreciated, such wear will cause reflection phase shifts. If the wear is significant, i.e., a scratch, such reflection phase shifts can reach between 180° and 360°.

These problems are magnified if one is using cartridges having multiple disks, such as that disclosed in U.S. Pat. No. 4,743,989—Bauck et al.

Consequently, a need exists to stabilize flexible media, while simultaneously locating the optical head a sufficient distance from the media to eliminate wear and further maintain the overall weight of the optical head assembly at a minimum.

SUMMARY OF THE INVENTION

The objects and advantages of the invention are achieved in methods and apparatus for providing Bernoulli stabilization to flexible media in an information storage system, are shown to include a stabilizer having a body on which a first surface is formed of a contour sufficient to provide Bernoulli stabilization to media passing thereover. The stabilizer is positioned so that the first surface is proximate backside of the media. In one embodiment, the first surface has a number of grooves which channel air passing between the first surface and said backside. In those situations where the flexible media includes two flexible disks, each having an active side and a backside and where the disks are oriented so that the backsides face one another, the body further includes a second surface of a contour sufficient to provide Bernoulli stabilization to media passing thereover. In such situations the stabilizer is positioned between the disks. In a still further embodiment the disks are rotatably mounted in a cartridge which includes a housing having an opening along one side thereof to allow access to the disks and a separator, attached to the housing and positioned between said disks, for providing separation of the disks. In such a situation when the cartridge is positioned in relation to the information system the space between the disks is accessible.

These and other objects and advantages of the invention will become more apparent from the following detailed description when taken in conjunction with the following drawings.

DETAILED DESCRIPTION

Figure 1:
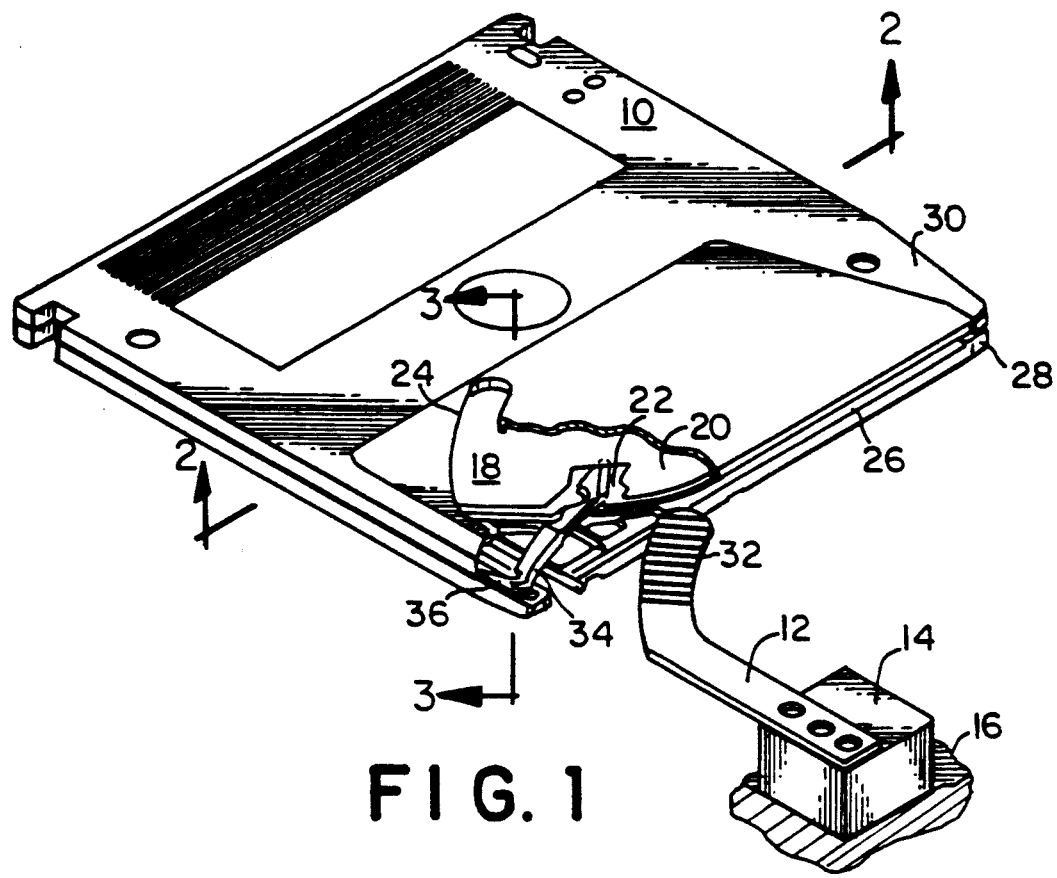
FIG. 1 is a diagrammatic view of a flexible media cartridge and relevant portions of a disk drive in accordance with the present invention.

The structure and methods for backside stabilization of flexible optical media in an information storage system as shown diagrammatically in FIG. 1. Generally, there is depicted a cartridge 10 and a stabilizer 12 which is securely attached by any suitable means to positioning block 14 which is in turn fixed to frame 16. Although not shown, it will be readily understood that frame 16 constitutes a portion of the frame on which the various components of the information storage system are mounted and in relation to which such components are positioned. For example, the motor and spindle mechanism which is used to drive media 18 rotatably mounted within cartridge 10 is attached at a pre-selected position on frame 16. Likewise, a read/write head which is used to write onto or read from disks 18 is attached via known mechanisms to frame 16.

Figure 2:
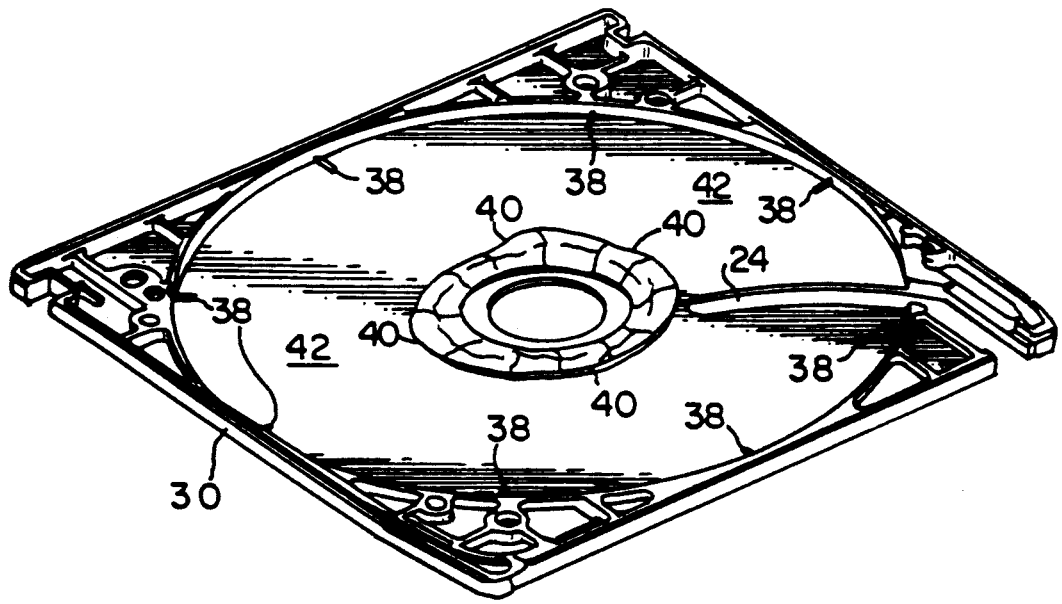
FIG. 2 is a section view along the lines 2—2 in FIG. 1.

The present invention is envisioned for use with any of several media types, namely, magnetic media, optical media or magneto-optical media. Regardless of which type of media is utilized in a given information storage system, the media generally includes an active layer in which information is stored which active layer is typically formed on a substrate layer. The active layer typically faces or is accessible from an active side of the media, whereas the substrate layer typically forms the backside of the media. As shown in FIG. 1, two disks 20 and 22 are positioned in an stacked relationship. The nature of such stacking and apparatus utilized to achieve such a combination has been described in U.S. Pat. No. 4,743,989—Bauck et al., which patent is incorporated herein by reference. In such an arrangement, each disk includes an active side and a backside. In the preferred embodiment, the disks are arranged so that the backsides are facing one another. For purposes of this description, the movement of the read/write head in relation to reading from or writing to a disk defines an area. Referring to FIG. 1, the movement of the read/write head and thus the movement area, is generally contained within the arcuate access slot 24. A more complete depiction of access slot 24 is shown in FIG. 2.

In accordance with the principles of the present invention, as cartridge 10 is positioned with respect to frame 16, i.e., as cartridge 10 is inserted into an optical information storage system which optical storage system which includes frame 16, stabilizer 12 will pass through slot 26 formed along one side of cartridge 10 between cartridge halves 28 and 30 and between disks 20 and 22. The length of stabilizer 12 is selected such that when cartridge 10 is finally positioned with respect to frame 16, i.e., fully inserted, the end portion 32 of stabilizer 12 will be positioned beneath access window 24 so that stabilizer 12 will stabilize the backside of disks 20 and 22 throughout the region included within the area defined by movement of the read/write head.

It will be appreciated by those who have utilized cartridges constructed in accordance with the previously described U.S. Pat. No. 4,743,989 that a problem will be encountered in the placement of stabilizer 12 between disks 20 and 22. This problem results from the attraction of the backsides of the respective disks towards one another. To this end, a separator 34 is provided for separating of disks 20 and 22 so that when cartridge 10 is positioned in relation to frame 16, i.e., inserted, stabilizer 12 can move between disks 20 and 22 in the region of separation caused by separator 34. Separator 34 is pivotally mounted at one end to cartridge 10 and is normally maintained in the position shown in FIG. 1 by means of a biasing member or spring 36. As will be appreciated, when cartridge 10 is positioned in relation to frame 16, i.e., inserted, the leading edge of stabilizer 12 will cause separator 34 to pivot and move out from between disks 20 and 22. Upon removal of cartridge 10, spring 36 serves to pivot separator 34 back into the position shown in FIG. 1.

Figure 3:
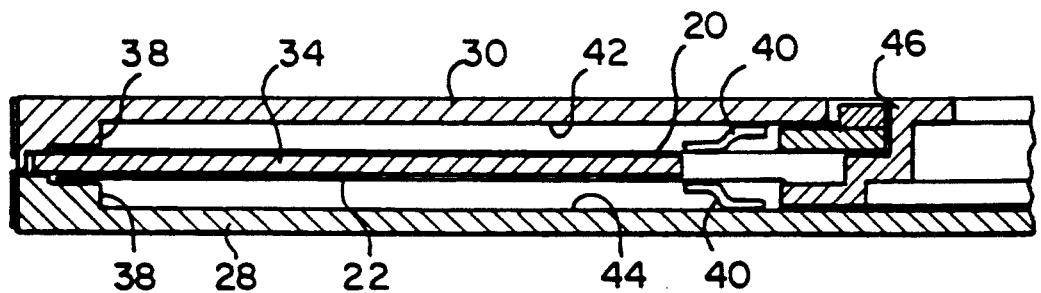
FIG. 3 is a section view along the lines 3—3 in FIG. 1.

In the preferred embodiment of the present invention, unlike the cartridge disclosed in U.S. Pat. No. 4,743,989, cartridge 10 does not include any integral Bernoulli surfaces. As shown in FIG. 2, top half 30 includes no Bernoulli surfaces, but rather, includes a plurality of pads 38 and wipers 40. Pads 38 are formed as short projections which are raised from surface 42 a short distance. Pads 38 are positioned, in the preferred embodiment, at 45° separations. Pads 38 serve to damp vibrations present at the outer circumference of disk 20. Wipers 40 are securely attached at one end to surface 42 and as will be seen in relation to FIG. 3, are designed to contact disk 20 in an area proximate the hub portion of the disk. Although bottom half 28 of cartridge 10 has not been depicted, it will be noted that identical pads 38 and wipers 40 are deposed thereon in a similar manner.

Figure 9:
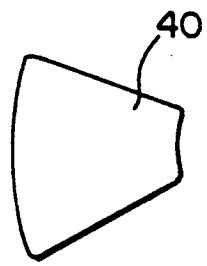
FIG. 9 is a plan view of a preferred wiper for use in the present invention.

The preferred shape of wiper 40 is shown in greater detail in FIG. 9. Referring to FIG. 3, wiper 40 is shown to be securely attached, by any suitable means, to surfaces 42 and 44. The unattached ends of wipers 40 rest on the regions of disks 20 and 22 which are proximate hub assembly 46. As will be appreciated, hub assembly 46 is designed for engagement with a drive spindle so that disks 20 and 22 can be rotated. The contact of wipers 40 with disks 20 and 22 serve to damp vibrations occurring at the inner regions of the disks. Although no particular material is preferred for wipers 40, it is desirable that the wipers be constructed from a material which provides a minimum pre-loading force onto the disks. It will also be appreciated from FIG. 3 that pads 38 are constructed to engage the outer circumferential area of disks 20 and 22. In the preferred embodiment, pads 38 engage 0.20 inches (radial distance) of the disks.

Figure 4:
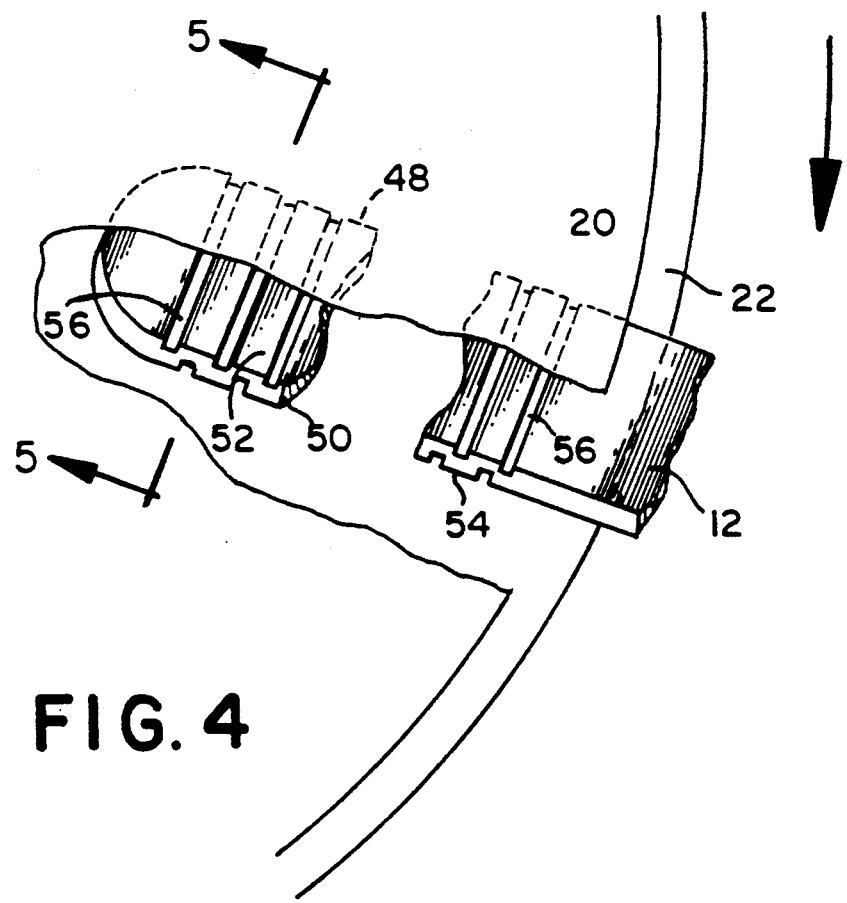
FIG. 4 is a partially broken perspective view of an alternative embodiment of the present invention.

Referring now to FIG. 4, stabilizer 12 is shown in greater detail. It will be noted that the shape of the end portion of 32 of stabilizer 12 is depicted differently in FIG. 1 than in FIG. 4. In the embodiment shown in FIG. 1, access slot 24 is arcuate shaped and end portion 32 is likewise arcuate shaped. In the embodiment shown in FIG. 4, end portion 48 is linerally shaped for use with an information storage system in which the optical read/write assembly exhibits linear movement. In either embodiment, stabilizer 12 provides Bernoulli stabilization to the backside of disks 20 and 22. Such Bernoulli stabilization is achieved in that stabilizer 12 includes a body 50 on which is formed a first surface 52 which surface 52 has a contour sufficient to provide Bernoulli stabilization. Surface 52 particularly serves to stabilize the backside of disk 20. Stabilizer 12 is further provided with a second surface 54, which is virtually identical to surface 52 with the exception that surface 54 is formed on the underside of stabilizer 12. A number of grooves 56 are formed in surfaces 52 and 54, which grooves serve to channel air passing between surfaces 52 and 54 and the backsides of disks 20 and 22. In the preferred embodiments, grooves 56 are offset between surface 52 and 54 and are oriented so that channeling of air is in a direction parallel to the movement of disks 20 and 22. It should also be noted that in the preferred embodiment grooves 56 are spaced approximately 0.1 inches apart, are approximately 0.08 inches wide and approximately 0.005 inches deep.

Figure 5:
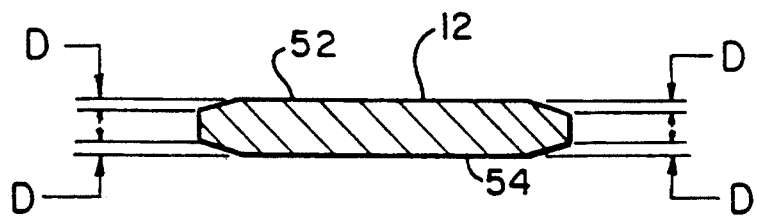
FIG. 5 is a section view along the lines 5—5 in FIG. 4.

The contoured surface of stabilizer 12 is more particularly shown in FIG. 5. Stabilizer 12 is shown to have a taper formed at either end of surfaces 52 and 54. In the preferred embodiment, the amount of taper, i.e., distance D, is approximately 0.003 inches.

Figure 6:
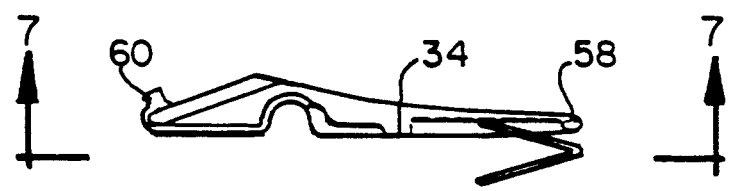
FIG. 6 is a plan view of a separator constructed in accordance with the present invention.
Figure 7:
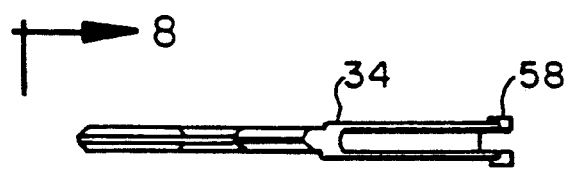
FIG. 7 is a front elevational view of the separator shown in FIG. 6.
Figure 8:
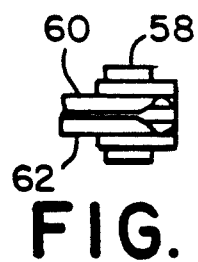
FIG. 8 is a view along the lines 8—8 in FIG. 7.

Referring now to FIG. 6, separator 34 is shown in greater detail. Although preferably formed as a single piece of molded plastic, separator 34 is shown to include one end formed as a circular bracket 58 for pivotal attachment to cartridge 10 by means of any suitable pin-type device. Separator 34 is depicted as having a tab 60 formed at its free end. As shown in greater detail in FIG. 8, two tabs 60 and 62 are in fact formed. Tabs 60 and 62 act in a manner similar to pads 38 in that when separator 34 has been moved out from between disks 20 and 22 by stabilizer 12, pads 60 and 62 nonetheless continue to project between the disks and aid in the stabilization of disks 20 and 22. Tabs 60 and 62 aid in the stabilization of disks 20 and 22 by damping vibrations existing in the outer circumference of the disks. The damping of such vibration occurs through contact between tabs 60 and 62 and the disks. It will also be noted at this point that when disks 20 and 22 are not rotating, but rather, are at rest, the outer circumference of the disks will rest on pads 38 and tab 60 or 62, depending on the orientation of the cartridge with respect to gravity.

Figure 10:
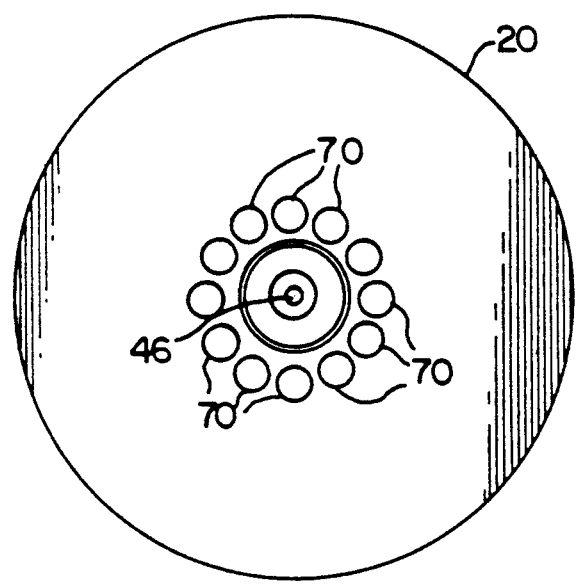
FIG. 10 is an isolated view of one disk depicted in FIG. 1.

Referring now to FIG. 10, the preferred embodiment of disk 20 is depicted. It will be recalled that disks 20 and 22 were attached to and separated slightly by hub assembly 46. Such assembly is shown in greater detail in U.S. Pat. No. 4,743,989. Disk 20 is shown to contain an array of perforations 70 equally spaced from one another and equidistant from the center of disk 20. When disks 20 and 22 are rotated together at high speeds, apertures 70 allow air to move radially out from between disks 20 and 22. Such air flow results air being ejected from between disks 20 and 22 due to centrifugal force. Evacuation of air in this manner creates a partial vacuum between the disks wherein the atmosphere surrounding the disks is at a higher pressure than the pressure between the disks. This pressure difference causes a flow of air into openings 70 and then radially out from between the disks which sets up an air bearing or cushion of air between disks 20 and 22.

The rate of rotation necessary to effect this air bearing is a function of several parameters, namely, disk size, aperture configuration, disk thickness, disk diameter, disk spacing and others. Speeds as low as 1500 RPM may be adequate to effect such an air bearing. However, higher degrees of stabilization can be achieved at higher rotation speeds.

In order to achieve the proper flow of air from between disks 20 and 22, the separation distance at hub assembly 46 is important. While the exact thickness will be a function of parameters such as the type of transducers used, the rate of rotation of the disks, and others, the separation distance at hub assembly 46 should be approximately 0.1 mm. In addition, hub assembly 46 should not impede the flow of air through apertures 70.

While the invention has been described and illustrated with reference to specific embodiments, those skilled in the art will recognize that modification and variations may be made without departing from the principles of the invention as described herein above and set forth in the following claims. For example, stabilizer 12 could be provided with a read/write assembly or other active device intended for operating between disks 20 and 22 without departing from the scope of the present invention. Likewise, stabilizer 12 could be constructed as a part of cartridge 10. Additionally, pads 38 could be contoured to provide still further stabilization to disks 20 and 22 as well as being adjusted in relation to the pressure existing in cartridge 10 during operation and/or the distance between disks 20 and 22 and pads 38 without departing from the scope of the present invention.

What is claimed is:

1. A stabilizer for providing Bernoulli stabilization in an information storage system to two flexible disks, each disk having an active side and a backside, wherein said disks are oriented so that said backsides are facing one another and wherein movement of said disks creates an air flow wherein air passes between said disks, said stabilizer comprising, a finger and first and second surfaces of a contour formed on said finger sufficient to provide Bernoulli stabilization to said disks passing thereover, each of said first and second surfaces having a number of grooves formed therein so that said air flow is channelled, wherein said stabilizer is positioned between said disks so that said first surface is proximate the backside of one disk and said second surface is proximate the backside of the other disk providing stabilization directly to the backsides of the disks and wherein air moving between said disks is channelled by the grooves formed in said first and second surfaces so that disruption of air moving between said disks is minimized.

2. The stabilizer of claim 1, wherein said grooves are oriented so that the channeling of air is in a direction parallel to the movement of said media.

3. The stabilizer of claim 1, wherein information is stored on or read from said media by moving a head assembly along an arcuate path and wherein said finger is generally arcuate shaped in a direction parallel to said arcuate path.

4. The stabilizer of claim 1, wherein information is stored on or read from said media by moving a head assembly along a linear path and wherein said finger is generally linearly shaped.

5. The stabilizer of claim 1, wherein said disks are rotatably mounted in a cartridge comprising a housing having an opening along one side thereof to allow access to the disks and a separator, attached to said housing and positioned between said disks, for providing separation of said disks, a frame in relation to which said cartridge is to be positioned and wherein said stabilizer is attached to said frame, so that when said cartridge is positioned in relation to said frame said stabilizer moves between said disks.

6. The stabilizer of claim 5, wherein said separator comprises a finger having one end pivotally mounted to said housing and having a projection wherein when said cartridge is positioned in relation to said frame said stabilizer causes said separator to pivot so that substantially all of said separator is moved from between said disks except for said projection and wherein said projection aids in the stabilization of said disks.

7. The stabilizer of claim 5, wherein said cartridge further comprises wipers attached to said housing and in contact with said disks for damping disk vibrations.

8. The stabilizer of claim 5, wherein said cartridge further comprises a plurality of pads which aid in the stabilization of said disks.

9. The stabilizer of claim 8, wherein said pads engage only the outer portions of said disks.

10. A cartridge for use with plural flexible disks in an information storage system, comprising a housing having an opening along one side thereof to allow access to the disks and a separator for providing separation of said disks so that when said cartridge is positioned in relation to said system the space between said disks is accessible and wherein said separator comprises a finger having one end pivotally mounted to said housing said finger having a projection wherein when said cartridge is positioned in relation to said system said separator can pivot so that substantially all of said separator is moved from between said disks except for said projection and wherein said projection aids in the stabilization of said disks.

11. The cartridge of claim 10, further comprising biasing means, attached between said housing and said finger, for normally biasing said finger to a position between said disks.

12. The cartridge of claim 10, wherein said cartridge further comprises wipers attached to said housing and in contact with said disks for damping disk vibrations.

13. The cartridge of claim 10 wherein one of said disks includes a plurality of apertures for allowing the passage of air radially outwardly from between the disk in which said apertures are formed and an adjacent disk forming an air bearing therebetween.

14. The cartridge of claim 10, wherein said cartridge further comprises a plurality of pads which aid in the stabilization of said disks by damping disk vibrations.

15. The cartridge of claim 14, wherein said pads engage only the outer portions of said disks.

16. A method for providing Bernoulli stabilization in an information storage system to two flexible disks, each having an active side and a backside, wherein said disks are oriented so that said backsides are facing one another, wherein movement of said disks creates an air flow, said method comprising the steps of providing a finger, forming a first and second surfaces of a contour sufficient to provide Bernoulli stabilization to disks passing thereover, and positioning said finger between said disks in an area where information is to be stored and retrieved so that said first surface is proximate the backside of one disk and said second surface is proximate the backside of the other disk, moving said media over said finger and channelling said air flow so that disruption of said air flow is minimized.

17. The method of claim 16, wherein said step of channelling said air flow comprises the step of providing a number of grooves in said first surface, wherein said grooves channel air passing between said first surface and the backside of the disk passing over said first surface.

18. The method of claim 16, wherein said disks are rotatably mounted in a cartridge comprising a housing having an opening along one side thereof to allow access to the disks, and further comprising the step of providing a separator, attached to said housing, between said disks so that when said cartridge is positioned in relation to said system so that the space between said disks is accessible.

* * * * *